(12) United States Patent
Severinsson

(10) Patent No.: US 7,066,304 B2
(45) Date of Patent: Jun. 27, 2006

(54) DISC BRAKE

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/901,792

(22) Filed: Jul. 29, 2004

(65) Prior Publication Data

US 2005/0039991 A1 Feb. 24, 2005

Related U.S. Application Data

(63) Continuation-in-part of application No. 10/600,722, filed on Jun. 20, 2003, now Pat. No. 6,889,801, and a continuation-in-part of application No. 10/160,903, filed on Jun. 3, 2002, now abandoned, which is a continuation of application No. PCT/SE01/02809, filed on Dec. 18, 2001, which is a continuation of application No. PCT/SE00/02401, filed on Dec. 1, 2000.

(30) Foreign Application Priority Data

Dec. 2, 1999 (SE) ..................... 9904396
Dec. 20, 2000 (SE) ..................... 0004715

(51) Int. Cl.
  *B60L 7/00* (2006.01)
  *F16D 55/08* (2006.01)
(52) U.S. Cl. ............... 188/72.8; 188/162; 188/72.1
(58) Field of Classification Search ............... 188/72.1, 188/72.3, 72.7, 72.8, 156, 157, 158, 159, 188/160, 161, 162, 71.2
See application file for complete search history.

(56) References Cited

U.S. PATENT DOCUMENTS

| | | | |
|---|---|---|---|
| 2,693,254 A | 11/1954 | Barish | 188/171 |
| 3,068,975 A | 12/1962 | Theuer | 192/8 |
| 4,154,321 A | 5/1979 | Falk | 188/72.7 |
| 4,877,113 A | 10/1989 | Taig | 188/82.84 |
| 5,107,967 A | 4/1992 | Fujita et al. | 188/72.1 |
| 5,161,650 A | 11/1992 | Taig | 188/72.8 |
| 5,433,301 A | 7/1995 | Eshghy | 188/250 G |
| 5,829,845 A | 11/1998 | Maron et al. | 303/20 |
| 5,949,168 A | 9/1999 | Dieckmann et al. | 310/75 R |
| 6,098,763 A | 8/2000 | Holding | 188/158 |
| 6,186,286 B1 | 2/2001 | Haussler et al. | 188/72.1 |
| 6,213,256 B1 * | 4/2001 | Schaffer | 188/71.9 |
| RE37,231 E | 6/2001 | Severinsson | 188/72.7 |
| 6,279,690 B1 * | 8/2001 | Schaffer | 188/71.9 |
| 6,279,691 B1 | 8/2001 | Takahashi et al. | 188/72.8 |
| 6,471,017 B1 | 10/2002 | Booz et al. | 188/72.7 |

FOREIGN PATENT DOCUMENTS

DE 196 25 355 A1 1/1998
EP 0886076 A2 12/1998

(Continued)

*Primary Examiner*—Thomas J. Williams
(74) *Attorney, Agent, or Firm*—St. Onge Steward Johnston & Reens LLC

(57) ABSTRACT

A disc brake for a heavy road vehicle has a caliper arranged at a brake disc mounted on a wheel axle of the vehicle. An electric motor and two thrust rods operationally connected thereto are provided in the caliper. The thrust rods transform a rotational ingoing movement from the motor into a linear outgoing movement for transmission to a disc brake pad, intended for braking engagement with the brake disc.

9 Claims, 9 Drawing Sheets

FOREIGN PATENT DOCUMENTS

| | | |
|---|---|---|
| GB | 1419236 | 3/1974 |
| WO | WO 97/10449 | 3/1997 |
| WO | WO 97/11287 | 3/1997 |
| WO | WO 99/21266 | 4/1999 |
| WO | WO 99/28648 | 6/1999 |
| WO | WO 02/50443 | 6/2002 |

* cited by examiner

DISC BRAKE

This application is a continuation in part of and claims the benefit of the filing date of U.S. patent application Ser. No. 10/160,903 filed Jun. 3, 2002 now abandoned which is a continuation of International Application PCT/SE00/02401 filed Dec. 1, 2000, which designates the United States and claims priority of Swedish Application No. 9904396-0 filed on Dec. 2, 1999. This application is also a continuation in part of and claims the benefit of the filing date of U.S. patent application Ser. No. 10/600,722 filed Jun. 20, 2003 now U.S. Pat. No. 6,889,801 which is a continuation of International Patent Application No. PCT/SE01/02809 filed Dec. 18, 2001, which designates the United States and claims priority of pending Swedish Application No. 0004715-9 filed Dec. 20, 2000.

FIELD OF THE INVENTION

The present invention relates to a disc brake, particularly for a heavy road vehicle, having a caliper arranged in the vicinity of at least one brake disc mounted on a wheel axle of the vehicle.

BACKGROUND OF THE INVENTION

Pneumatically operated disc brakes for heavy road vehicles, such as buses, trucks and trailers, have become more customary during recent years. It has appeared that the tough requirements on such brakes have led to designs that differ rather drastically from disc brake designs used for lighter vehicles and most often hydraulically operated.

The development at the present time is towards more use of electric equipment and electric control for more and more functions on the vehicles and system integration in the vehicles in order to achieve enhanced performance, for example dynamic stability control, rollover protection, and collision avoidance.

Also, by the use of electric power it is possible to dispense with air tanks and similar equipment.

It is thus quite natural that the possibility to use electric power also for braking a heavy road vehicle provided with brake discs is being discussed.

The object of the invention is to provide a disc brake for a heavy road vehicle, where electric power can be used, the disc brake fulfilling all requirements with regard to brake force, controllability, reliability, volume, price, and so forth.

SUMMARY OF THE INVENTION

This object is according to the invention attained in that an electric motor and at least two thrust rods operationally connected thereto are provided in the caliper, said thrust rods transforming a rotational ingoing movement from the motor into a linear outgoing movement for transmission to a disc brake pad, intended for braking engagement with the brake disc.

The electric motor is hereby driven in one rotational direction for brake application and in the opposite direction for brake release.

Preferably, a coupling keeping its outgoing shaft non-rotatable in the release direction, when no current is fed to the motor, and a gearbox are operationally arranged between the electric motor and the at least two thrust rods. By the use of such a coupling no electric power is needed for keeping the brake applied, which leads to a lower power consumption, lower temperatures and a simplified control system.

The motor, the coupling, and the gearbox are preferably coaxial with each other.

BRIEF DESCRIPTION OF THE DRAWINGS

The invention will be described in further detail below reference being made to the accompanying drawings, in which.

DETAILED DESCRIPTION OF DRAWINGS

Figure 1:
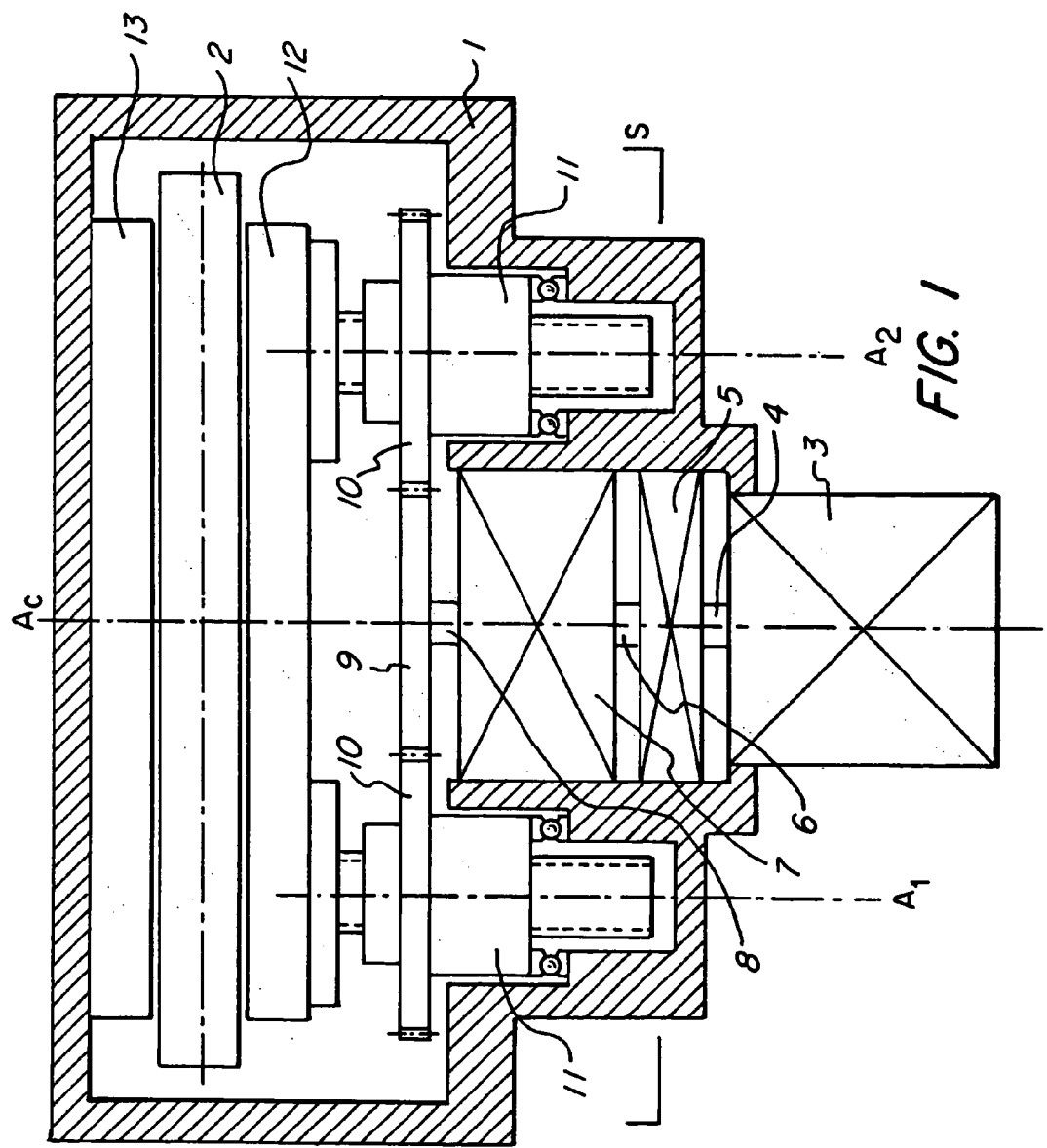
FIG. 1 is a schematic top view, partly in section, of a disc brake according to the invention.

A disc brake according to the invention is very schematically shown in FIG. 1, to which reference first is made. A disc brake caliper 1 is to be mounted astraddle of a brake disc 2 on a vehicle axle. The vehicle is preferably a heavy road vehicle, such as a bus, a truck or a trailer, but the invention is also applicable to other vehicles.

Figure 12:
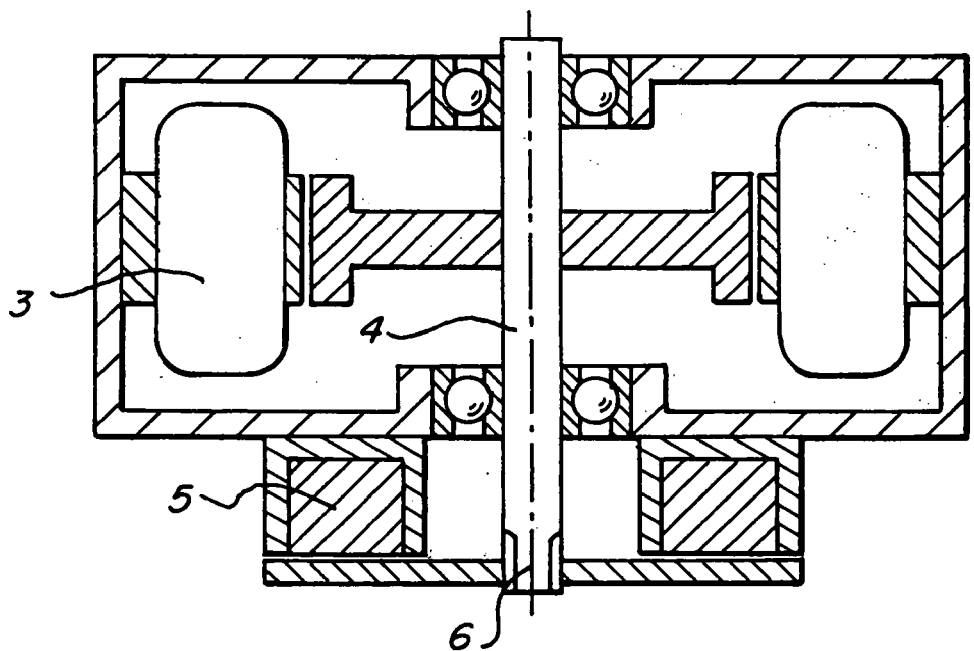
FIG. 12 is another schematic top view, partly in section, indicating the electromagnetic coupling of a disc brake according to the invention.

An electric motor 3 is attached to the caliper 1. Its drive shaft 4, which may be rotated in either direction by the motor 3, is connected to a coupling 5 of the kind that keeps its outgoing coupling shaft 6 non-rotatable or braked, in a brake release direction, when no current is supplied to the motor 3. This coupling 5 may have either of a number of different designs:

a) Electromagnetic coupling. The shaft 6 is locked in a brake release direction, when an electromagnet 53 in the coupling is energized. Such an electromagnetic coupling is illustrated in figure 12. Electromagnetic clutch 5 has a coil, which is energized for locking the drive shaft 4 in the brake release direction unless the motor 3 is energized for rotation in that direction.

b) Inverse electromagnetic coupling. The shaft 6 is locked in the release direction with a spring activated lock mechanism 52 and is released, when an electromagnet 53 in the coupling is energized.

c) Motor-actuated coupling. The shaft 6 is locked in the release direction by means of a mechanical lock mechanism 51 (of locking spring type or lamella type). The function of the mechanism is such that rotation of the motor 3 in the brake release direction unlocks the coupling and allows a rotation of the shaft 6 corresponding to the rotation of the motor.

d) Motor-actuated and inverse electromagnetic coupling. The shaft 6 is locked in the release direction by means of a mechanical lock mechanism (of locking spring type or lamella type). The function of the mechanism is such that rotation of the motor in the brake release direction unlocks the coupling and allows a rotation of the shaft 6 corresponding to the rotation of the motor. The shaft 6 can also be released in the brake release direction in that an electromagnet in the coupling is energized.

A coupling 5 of any of the two latter types is normally used in the brake according to the invention. A coupling 5 of the last-mentioned type may be applicable if the total brake system requires two independent ways of abolishing the brake force for security reasons.

Couplings of types b) and c) can be supplemented with a manual release mechanism.

The coupling shaft 6 is in turn connected to a gear box 7 for reducing the rotational speed from the coupling shaft 6 to its outgoing gearbox shaft 8. The gear mechanism is preferably a planetary gearing, but other mechanisms are also conceivable. The gear ratio can be chosen according to the specific requirements.

Figure 2:
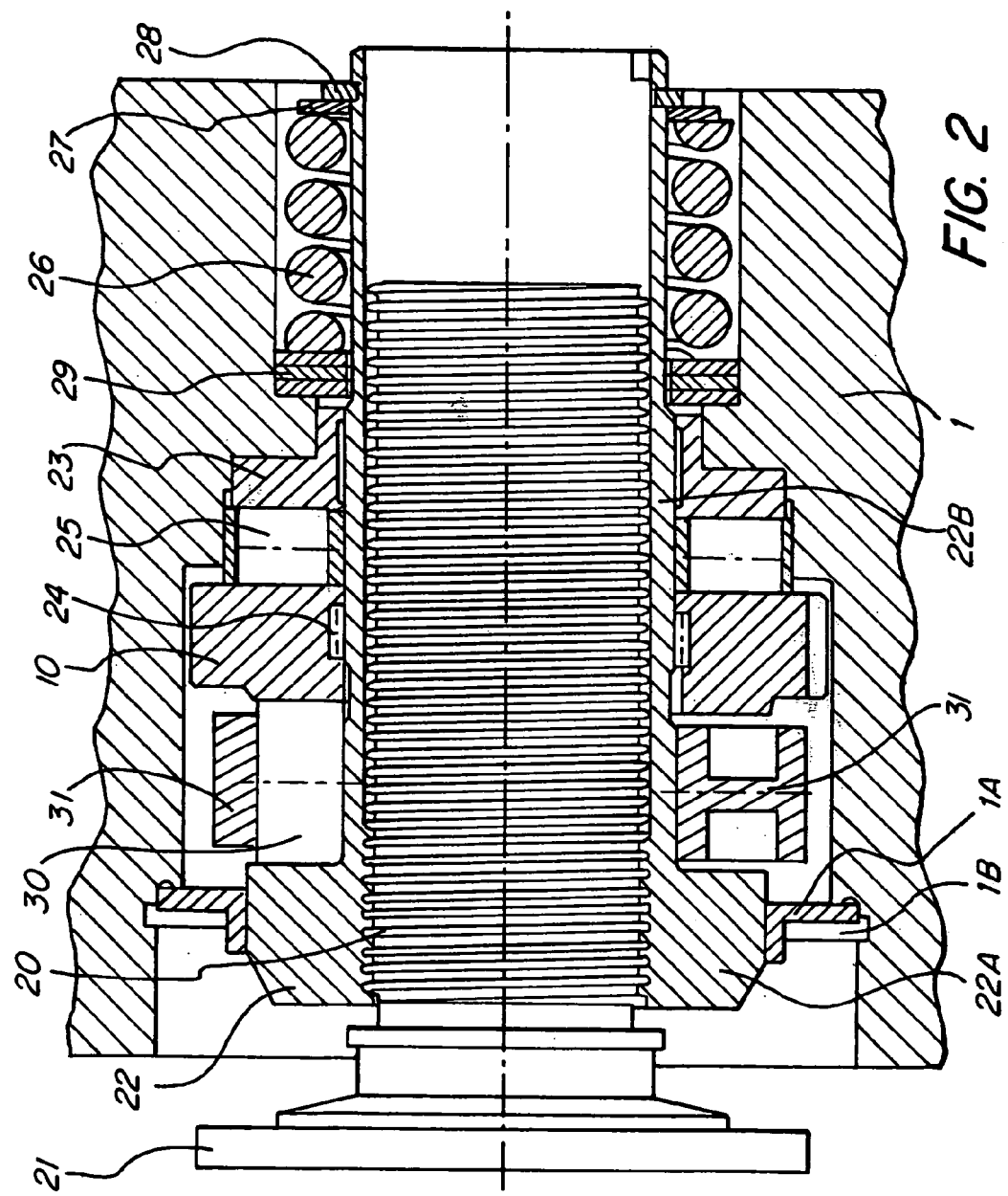
FIG. 2 is a section through a thrust rod mounted in the disc brake according to the invention.
Figure 3:
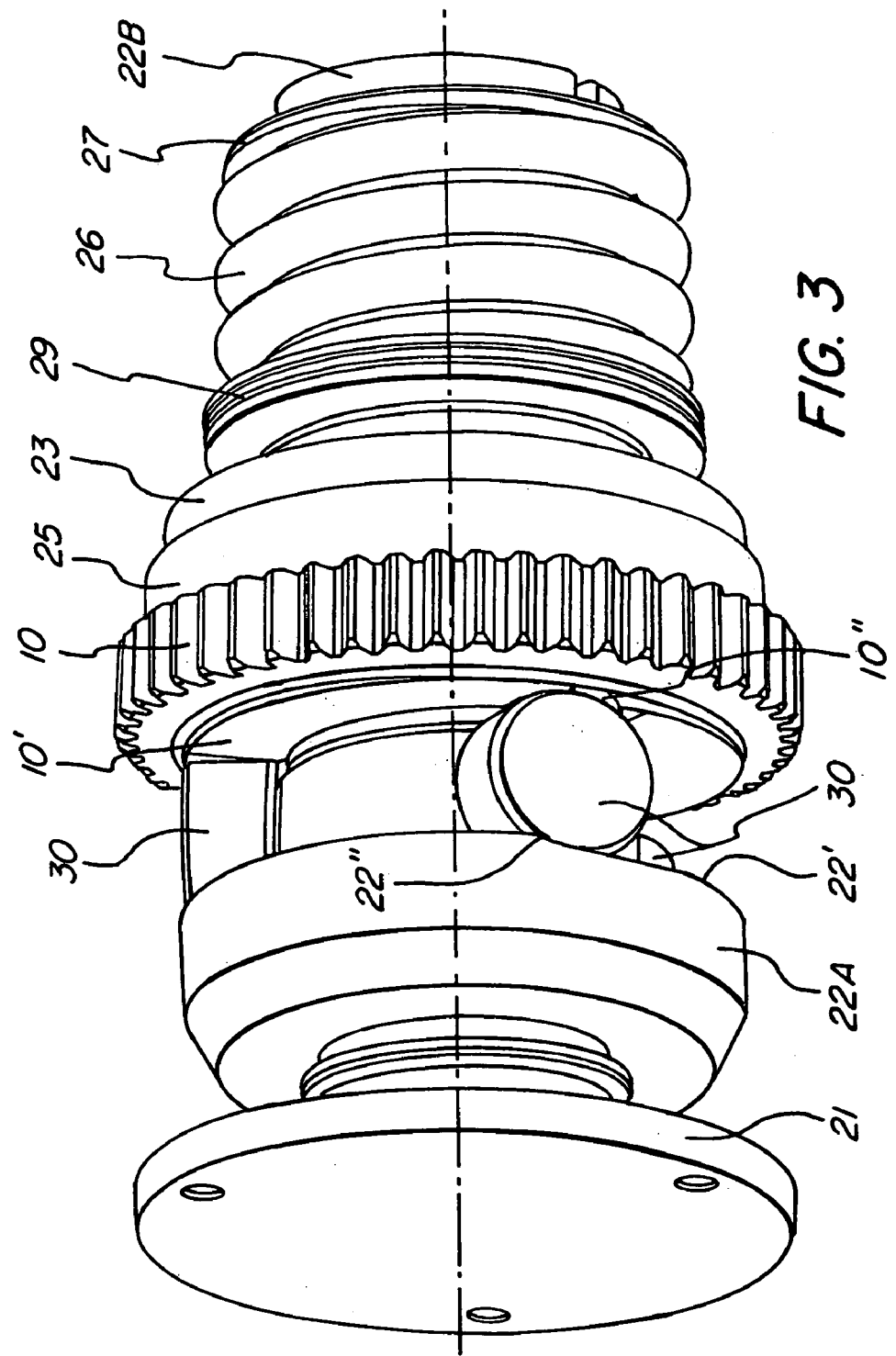
FIG. 3 is a perspective view of the thrust rod.
Figure 8:
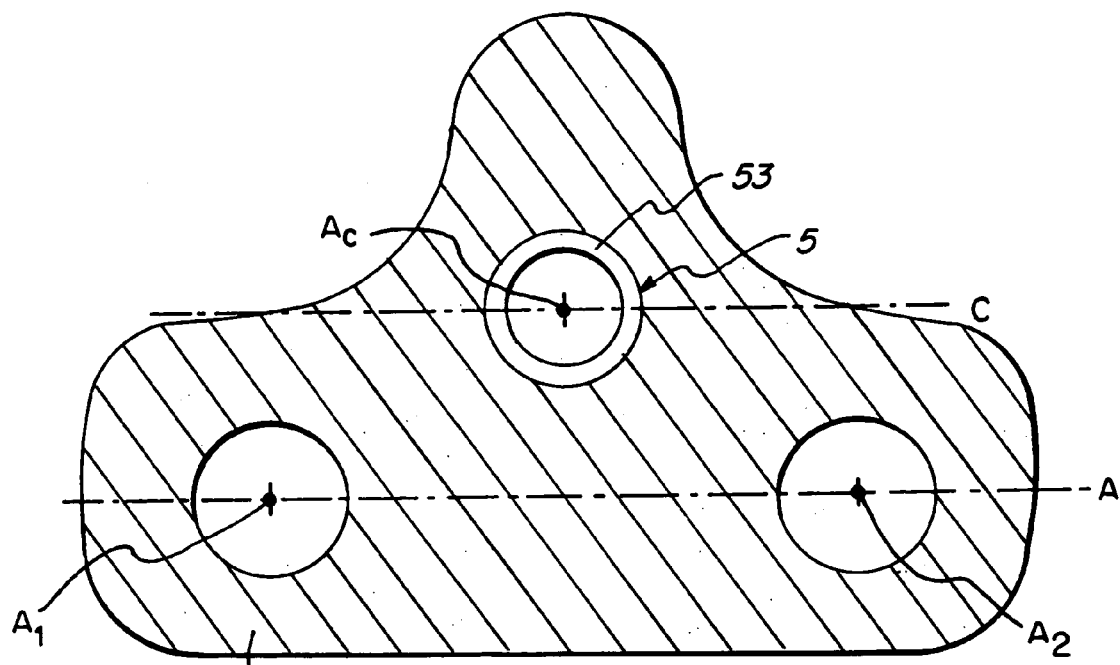
FIG. 8 is a back view, partly in section taken along section S, of another embodiment of the disc brake according to the invention, indicating the electromagnet.

The gear box shaft 8 is provided with a gear 9 in gear engagement with a thrust rod gear 10 of each of two thrust rods 11 to be further described under reference to FIGS. 2 and 3. The three gears 9 and 10 may have the same diameter and rotate with the same speed. However, depending on the circumstances, they may have different diameters. In the shown case the different members are arranged in a common plane, but it will equally well be possible to have the motor 3 with the coupling 5 and the gear box 7 in another plane (plane C) than the axes $A_1$ and $A_2$ of the two thrust rods 11 which define plane A in FIG. 8, so that a space-saving design may be accomplished.

The thrust rods 11 will perform the general function of transforming the ingoing rotational movement of the gear 10 into an outgoing linear movement of a part connected to the first disc brake pad 12. In principle, the thrust rods 11 could thus be of a screw-and-nut design, such as so called ball screws or the like, but in a practical case another design to be described is chosen.

The thrust rods 11 are connected to a first disc brake pad 12 at one side of the brake disc 2. At the other side of the brake disc 2 there is a second disc brake pad 13 connected to the caliper 1, which is of the so called floating type, i.e. it is mounted for certain movements perpendicularly to the disc 2.

With the briefly described design the first disc brake pad 12 will be applied against the brake disc 2, when the motor 3 is rotated in its application direction. At a motor rotation in the opposite direction the disc brake pad 12 will be withdrawn from the brake disc 2.

In the shown and described case the number of thrust rods 11 is two, but an arrangement with more than two thrust rods is within the scope of the invention.

The design of each of the thrust rods 11 will now be described under reference to FIGS. 2 and 3.

A threaded spindle 20 is at its end extending out of the thrust rod 11 provided with an attachment plate 21 for attachment to the first disc brake pad 12 (FIG. 1). (Alternatively, the attachment plate 21 may be a separate part rotationally locked to the spindle 20.) There is a rotational lock (not shown) between the attachment plate 21 and the caliper 1. The spindle 20 is thus non-rotatably mounted. A nut member 22 comprises a nut 22A and an elongated tube 22B integral with each other. The nut 22A is in thread engagement with the spindle 20, which is then basically enclosed by the tube 22B. The nut member 22 is guided at its tube 22B by a fixed ring 23 secured to the caliper 1 (FIG. 2) and also at its nut 22A by an annular slide member 1A held to the caliper 1 by a locking ring 1B.

The thrust rod gear 10 is rotatable on the tube 22B by means of a radial bearing 24 and in relation to the fixed ring 23 by means of an axial bearing 25.

An axial bias to the right in FIGS. 2 and 3 is exerted on the nut member 22 by means of a compression spring 26 arranged between on one hand an annular washer 27 and a spring clip 28 in a groove on the tube 22 and on the other hand a bearing 29 cooperating with a caliper flange part, which as shown in FIG. 2 extends down to the right of the ring 23 fastened to the caliper.

Force-transmitting rollers 30, preferably three rollers equidistantly distributed around the periphery of the tube 22B, are arranged with their axes radial to the spindle 20 between radial surfaces—to be described—on the sides facing each other of the thrust rod gear 10 and the nut 22A. The rollers 30 are rotatably held in a roller cage 31 (which is omitted in FIG. 3 for the sake of clarity) with a width smaller than the diameter of the rollers 30 so as not to interfere with the free rolling thereof.

As appears from FIG. 3, said radial surfaces 10' and 22' of the thrust rod gear 10 and the nut 22, respectively, are parallel ramp surfaces each having a small inclination or pitch in relation to a plane perpendicular to the axis of the spindle 20. These ramp surfaces 10', 22' have end surfaces 10", 20", against which a roller 30 is applied (under the bias of the compression spring 26) in a rest position shown in FIG. 3.

The function at a brake application of the disc brake described above with reference to FIG. 1 and especially of its thrust rods 11 described above with reference to FIGS. 2 and 3 is as follows, starting from a situation as shown in FIG. 1 with the disc brake pad 12 at a certain distance from the brake disc 2 and as shown in FIG. 3 with the rollers 30 in the described rest positions. The electric motor 3 is rotated in its direction for brake application, and this rotation is transferred via the coupling 5, the gear box 7, and the gear 9 to the respective thrust rods 11.

The rotation is imparted to the thrust rod gear 10. As long as the brake pad 12 has not reached the brake disc 2, there is no substantial counterforce in the thrust rod spindle 20. The rollers 30 are held in their rest positions against the ramps, as shown in FIG. 3, and the rotation of the thrust rod gear 10 is transferred to the nut member 22 via the rollers 30, so that the spindle 20 is brought axially forward, until contact between the disc brake pad 12 and the brake disc 2 has been established and a counterforce has been built up.

At this stage and at a continued rotation of the thrust rod gear 10 the rollers 30 will begin to roll along their respective ramp surfaces 10', 22', so that the nut member 22 and thus the spindle 20 will be brought forward axially with a great force for accomplishing a brake application.

Conversely, when hereafter the motor 3 is rotated in the opposite direction for a return stroke, the rollers 30 will first roll down their respective ramp surfaces 10', 22' for reestablishing the positions shown in FIG. 3. At this movement the spindle 20 will be brought back, so that the counterforce therein decreases. At the continued rotation the bias of the spring 26 will again see to it that the rotation of the thrust rod gear 10 is transferred via the rollers 30 to the nut member 22, which will pull back the spindle 20. Means can be provided to ensure that this return rotation is concluded, when a suitable distance or slack has been established between the disc brake pad 12 and the brake disc 2. For example, the measured number of rotations can be used to control this distance or slack.

The inclination or pitch of the ramp surfaces 10', 22' may as shown in FIG. 3 be even over the entire length of the surfaces, but it is equally possible to vary the pitch over the length. For example, it may be suitable to have a larger pitch in the beginning of the ramp surfaces and then to decrease it in order to make better use of the characteristics of the motor 3.

Figure 4:
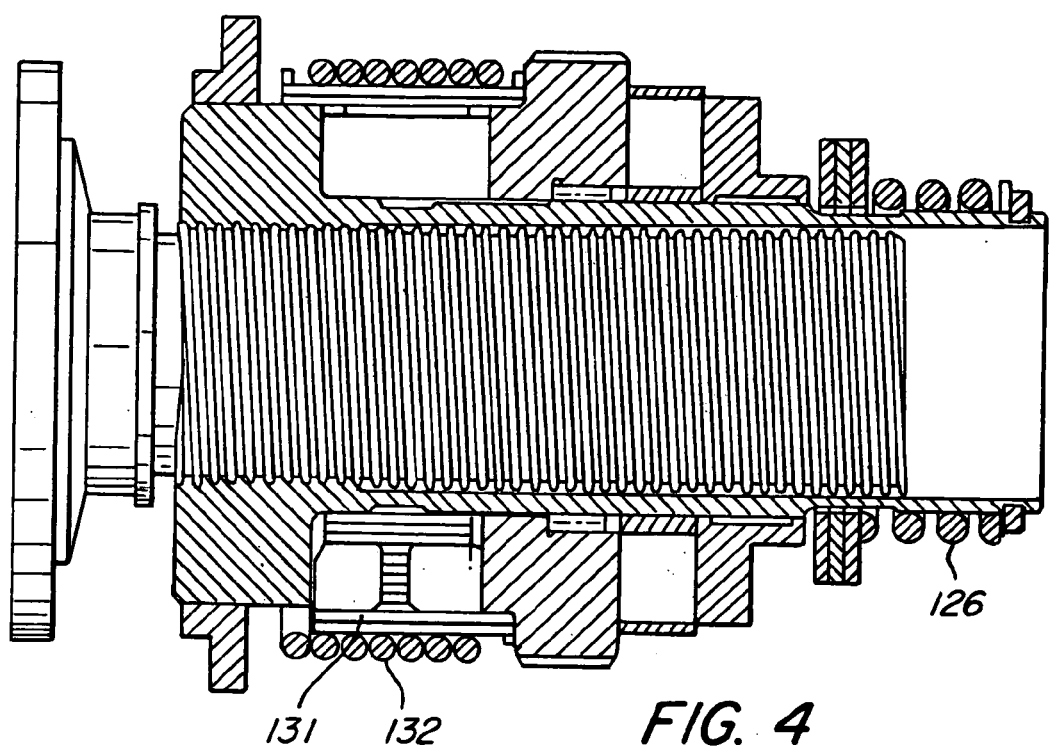
FIG. 4 is a section to a smaller scale through a modified thrust rod.
Figure 5:
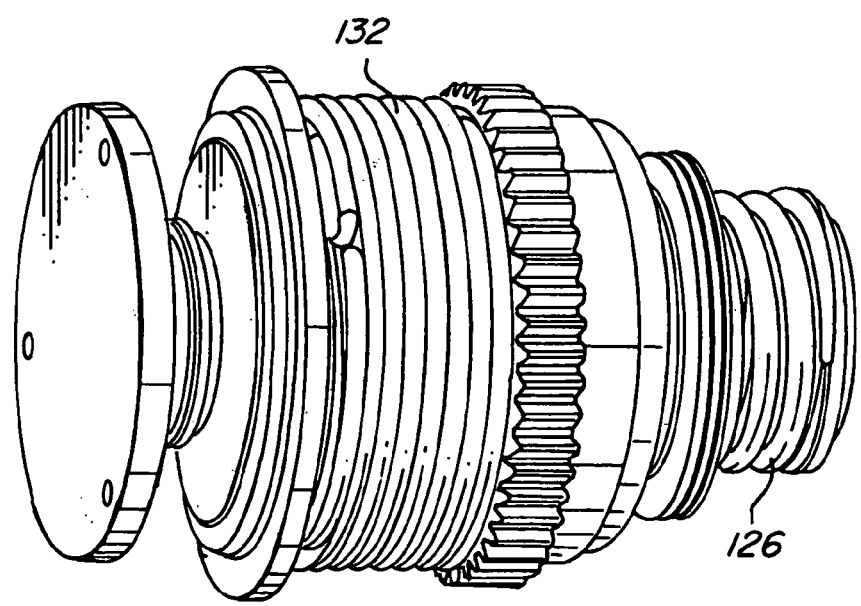
FIG. 5 is a perspective view to a smaller scale of the modified thrust rod of FIG. 4.
Figure 6:
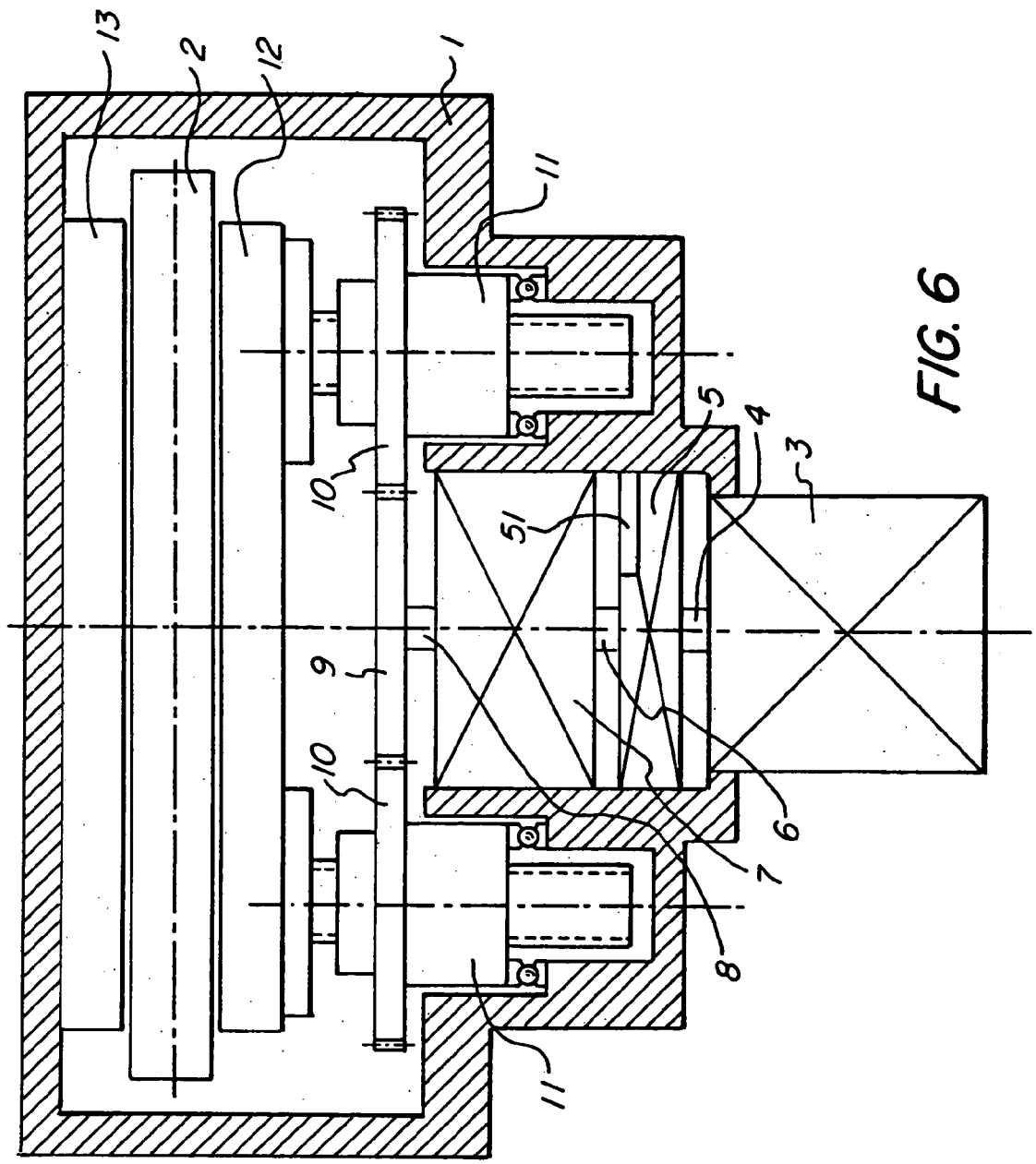
FIG. 6 is another schematic top view, partly in section, of a disc brake according to the invention, indicating the mechanical lock mechanism.
Figure 7:
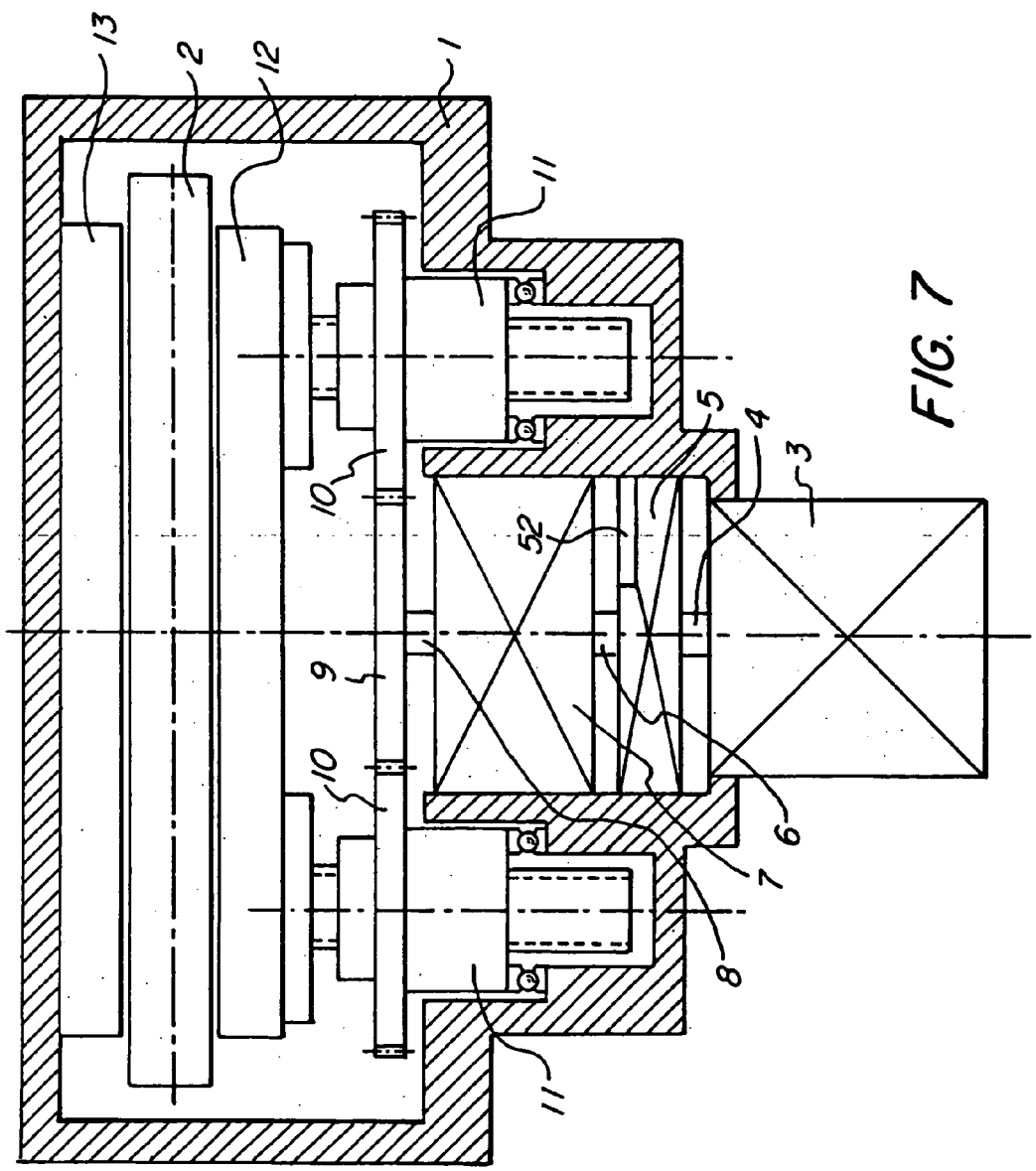
FIG. 7 is another schematic top view, partly in section, of a disc brake according to the invention, indicating the spring activated lock mechanism.

A modification of the thrust rod 11 according to FIGS. 2 and 3 is shown in FIGS. 4 and 5. Only the modification as such will be described. In other respects the thrust rod 11 is unchanged. For the sake of clarity only such reference numerals that are necessary for an understanding of the modification are used in FIGS. 4 and 5.

In the version of FIGS. 2 and 3 the spring arrangement 26–29 had the primary purpose of applying a bias on the roller and ramp arrangement 30, 10', 22' for obtaining the function described above.

A similar spring arrangement is provided in the modification according to FIGS. 4 and 5, but its compression spring 126 provides a comparatively small force only to keep the different parts of the thrust rod 11 together.

The necessary bias for the roller and ramp arrangement is instead provided by a coiled spring 132 supported by a slightly modified roller cage 131. The respective ends of this coiled spring 132 are attached to the thrust rod gear 10 and the nut 22A, as is illustrated in FIG. 5.

The function of the modified thrust rod 11 is the same as has been described above.

Figure 9:
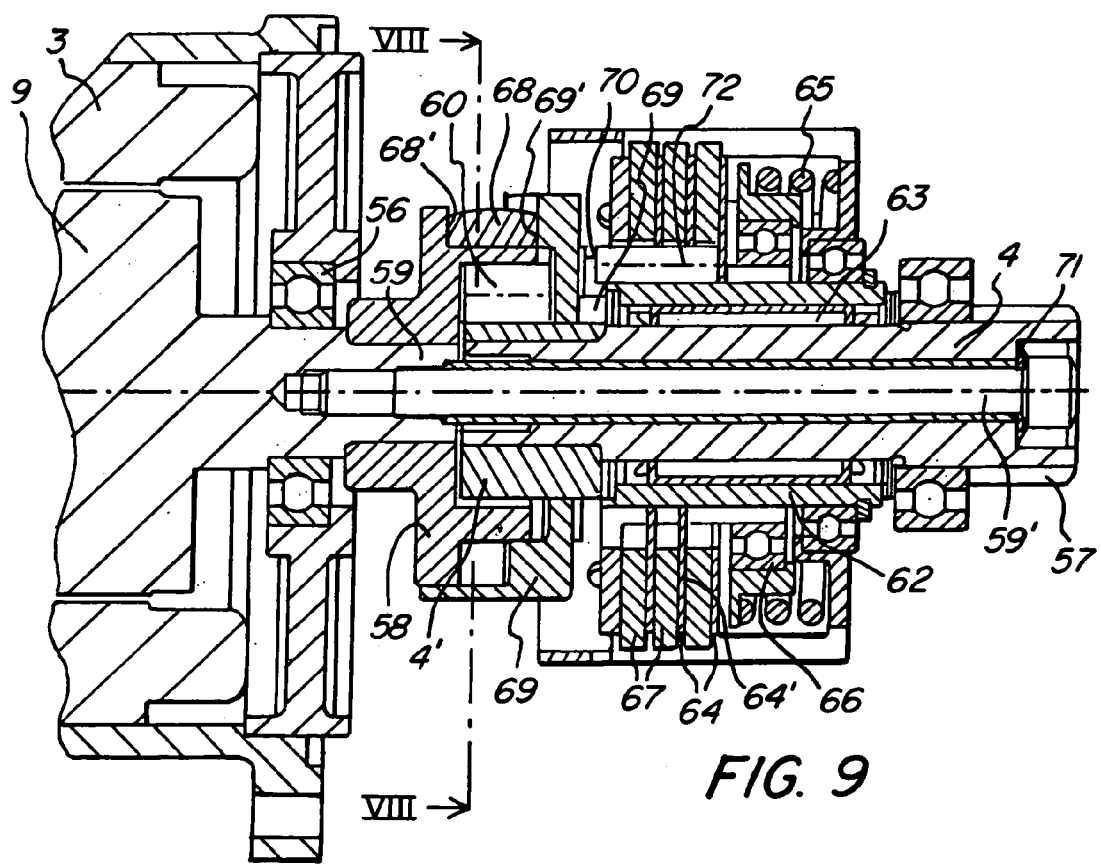
FIG. 9 is section through an electric motor with a second embodiment of a transmission brake according to the invention.
Figure 10:
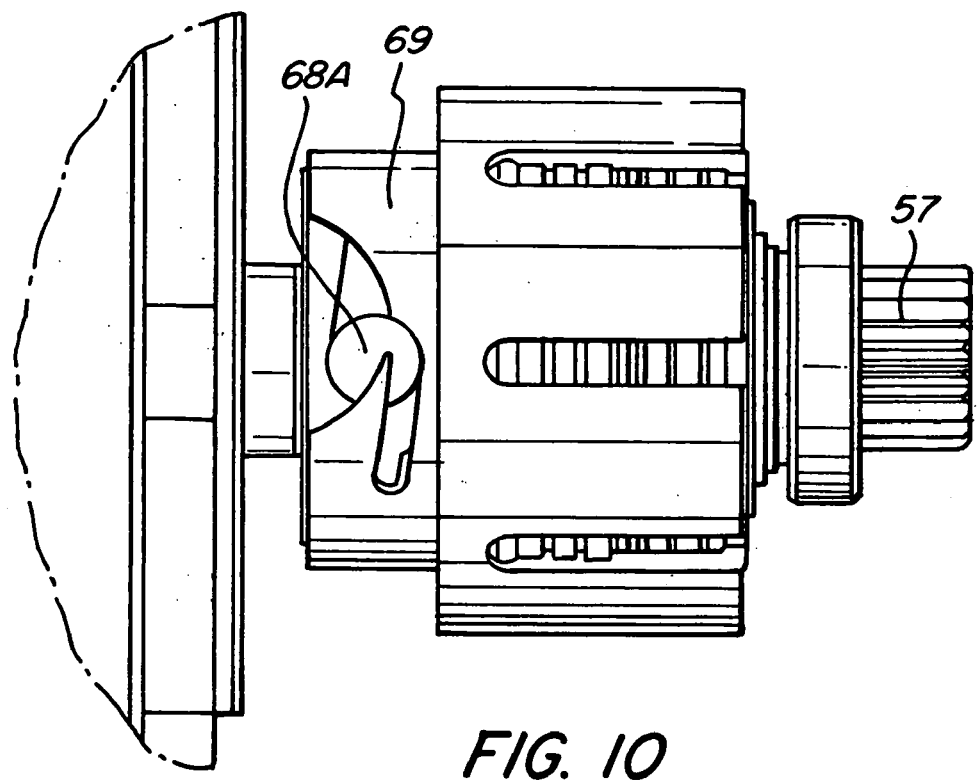
FIG. 10 is a side view generally corresponding to FIG. 9 but to a smaller scale.
Figure 11:
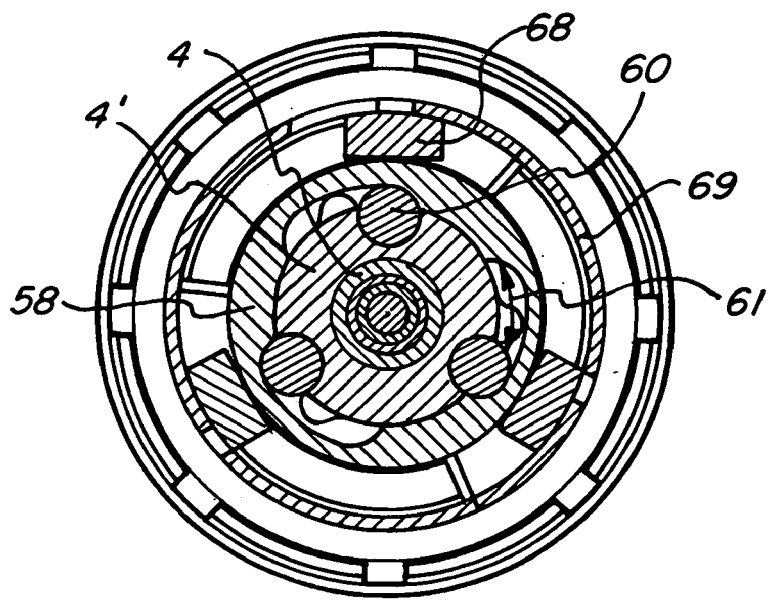
FIG. 11 is a sectional view along the line VIII-VIII in FIG. 9.

An alternative embodiment of a disk brake according to the invention having a coupling that keeps its outgoing shaft non-rotatable or braked, in a brake release direction, when no current is supplied to the motor 3 is illustrated in FIGS. 9–11.

The shaft 4 from the motor 3 is rotationally movably attached to a rotor 59 by means of a screw 59' and has a gear 57.

The ramp ring 58 is arranged on the rotor 59, whereas the shaft 4 is provided with a shaft hub 4'. Cylindrical driver elements 60 are—as shown in FIG. 11—arranged in the shaft hub 4' and extend into recesses in the ramp ring 58, so that there is a certain rotational play 61 between the shaft 4 (or rather its hub 4') and the ramp ring 58. The driver elements 60 are elastic.

The coupling 5 includes: the splines ring 62, the one-way coupling 63, the brake discs 64 connected to the splines ring 62, the compression spring 65, the bearing 66, the lamellas 67 connected to the housing of coupling 5, the rollers 68, the ramp sleeve 69 being rotationally locked to the shaft hub 4' at 69', the axial play 70 formed between the ramp sleeve 69 and push pins 72 extending through the brake discs 2 (except the one furthest to the right in FIG. 9), and the axial bearing 71.

When the electric motor rotates in the direction for brake application, the ramp ring 58 carries the shaft 4 with it. The shaft 4 rotates in the non-locking direction of the one-way coupling 63.

When the electric motor is stopped, so that the torque on the ramp ring 58 disappears and the shaft 4 has a tendency to rotate in the opposite direction or brake release direction, this rotation is blocked by the one-way coupling 63 and the brake disc 2.

When the electric motor is rotated in the opposite direction for brake release, the ramp ring 58 will move rotationally in the play 61, so that the rollers 68 roll up the ramp surfaces 68' and 69' and the friction between the friction material 64' on the brake disc 2 and the lamella 67 ceases. Finally, the brake disc 2 and thus the shaft 4 will be allowed to rotate in the brake release direction.

The disc brake has been shown and described in its use together with one brake disc, but it is to be understood that it may be used also when there are more than one brake disc in an arrangement, for example two brake discs.

What is claimed is:

1. A disc brake having a caliper arranged in the vicinity of at least one brake disc mounted on a wheel axle of the vehicle, wherein an electric motor, a drive shaft driven by the motor in one rotational direction about a longitudinal axis for brake application and in the opposite rotational direction about the longitudinal axis for brake release, a coupling having a coupling shaft coaxial with the drive shaft for transmitting rotational movement of the drive shaft to the coupling shaft, and at least one thrust rod operationally connected to the coupling shaft are provided in the caliper, said at least one thrust rod transforming rotational movement of the coupling shaft about the rotational axis into linear movement of a disc brake pad along the longitudinal axis for braking engagement with the at least one brake disc, characterized in that the coupling keeps the coupling shaft nonrotatable in the brake release direction when no current is fed to the motor, and is operationally arranged between the electric motor and the at least one thrust rod.

2. A disc brake according to claim 1, characterized in that the coupling includes an electromagnet for releasing the coupling shaft when energized.

3. A disc brake according to claim 1, characterized in that the coupling includes an electromagnet for locking the coupling shaft when energized.

4. A disc brake according to claim 1, characterized in that the coupling includes a spring activated lock mechanism for locking the coupling shaft in the brake release direction and an electromagnet for releasing the shaft when energized.

5. A disc brake according to claim 1, characterized in that a gear box, operationally arranged between the coupling and the at least one thrust rod, is a planetary gear box.

6. A disc brake according to claim 5, characterized in that the outgoing shaft of the gear box is provided with a gear cooperating with an ingoing gear of the at least one thrust rod.

7. A disc brake according to claim 5, characterized in that the motor, the coupling, and the gear box are coaxial with each other.

8. A disc brake according to claim 7, comprising two thrust rods.

9. A disc brake according to claim 8, characterized in that the common axis of the motor, the coupling, and the gear box is in a plane different from the common plane defined by the axes of the two thrust rods, when the disc brake comprises two thrust rods.

* * * * *